(12) United States Patent
Yu et al.

(10) Patent No.: US 6,872,113 B2
(45) Date of Patent: Mar. 29, 2005

(54) METHOD FOR MAKING A STRUCTURE OF ORGANIC LIGHT-EMITTING MATERIAL TFT DISPLAY

(75) Inventors: Zon-Zer Yu, Taipei (TW); Huang-Chung Cheng, Hsinchu (TW); Dong-Yuan Goang, Chung Li (TW)

(73) Assignee: Allied Material Technology Corp., Taoyuan (TW)

( * ) Notice: Subject to any disclaimer, the term of this patent is extended or adjusted under 35 U.S.C. 154(b) by 0 days.

(21) Appl. No.: 10/701,563

(22) Filed: Nov. 6, 2003

(65) Prior Publication Data

US 2004/0100595 A1 May 27, 2004

Related U.S. Application Data

(62) Division of application No. 10/164,700, filed on Jun. 10, 2002, now Pat. No. 6,738,113.

(51) Int. Cl.[7] ................................................. H01J 9/00
(52) U.S. Cl. ......................... 445/24; 445/25; 315/169.3; 427/66
(58) Field of Search ................................ 313/501, 506, 313/504; 445/24, 25; 427/65; 349/69; 315/169.3; 257/98, 89

(56) References Cited

U.S. PATENT DOCUMENTS

| | | | | |
|---|---|---|---|---|
| 5,998,805 A | * | 12/1999 | Shi et al. ...................... 257/40 |
| 6,075,316 A | * | 6/2000 | Shi et al. ..................... 313/504 |
| 6,114,715 A | * | 9/2000 | Hamada ........................ 257/72 |
| 6,384,529 B2 | * | 5/2002 | Tang et al. ................... 313/506 |
| 6,420,834 B2 | * | 7/2002 | Yamazaki et al. ......... 315/169.3 |
| 6,538,374 B2 | * | 3/2003 | Hosokawa ................... 313/504 |
| 6,555,968 B2 | * | 4/2003 | Yamazaki et al. ......... 315/169.3 |
| 6,670,772 B1 | * | 12/2003 | Arnold et al. ............. 315/169.3 |
| 6,750,618 B2 | * | 6/2004 | Yamazaki et al. ......... 315/169.3 |
| 6,777,870 B2 | * | 8/2004 | Sundahl ....................... 313/504 |
| 2001/0009280 A1 | * | 7/2001 | Tanaka et al. .................. 257/59 |
| 2003/0127656 A1 | * | 7/2003 | Aizawa et al. ................ 257/79 |
| 2003/0190763 A1 | * | 10/2003 | Cok et al. ...................... 438/22 |
| 2003/0201708 A1 | * | 10/2003 | Yamada et al. ............. 313/495 |
| 2003/0203551 A1 | * | 10/2003 | Cok et al. ................... 438/200 |
| 2003/0230972 A1 | * | 12/2003 | Cok ............................ 313/504 |
| 2004/0070335 A1 | * | 4/2004 | Cok ............................ 313/506 |
| 2004/0075385 A1 | * | 4/2004 | Tao ............................. 313/506 |
| 2004/0081852 A1 | * | 4/2004 | Chen et al. .................. 428/690 |
| 2004/0090175 A1 | * | 5/2004 | Urabe et al. ................ 313/504 |
| 2004/0169462 A1 | * | 9/2004 | Sasaki ........................ 313/503 |
| 2004/0198129 A1 | * | 10/2004 | Chang et al. .................. 445/24 |

FOREIGN PATENT DOCUMENTS

| | | |
|---|---|---|
| CN | 1287768 A | 3/2001 |
| CN | 1313521 A | 9/2001 |

* cited by examiner

*Primary Examiner*—Kenneth Parker

(57) ABSTRACT

A structure of an organic light-emitting material TFT display and the method for making the same are disclosed. The invention provides a glass substrate formed with a plurality of TFTs thereon. A metal layer is formed on top of the TFT's. Afterwards, a planarized film layer covers the TFTs and the metal layer. The planarized film layer is formed with an organic light-emitting material pattern layer with red, blue and green colors. The organic light-emitting material pattern layer is in alignment with the TFT pattern. A transparent conductive glass layer is formed on top of the light-emitting material pattern layer. Finally, a photo mask pattern fills the light-emitting material pattern layer to prevent the mixture of different colors.

8 Claims, 1 Drawing Sheet

METHOD FOR MAKING A STRUCTURE OF ORGANIC LIGHT-EMITTING MATERIAL TFT DISPLAY

This is a Division of application Ser. No. 10/164,700, filed Jun. 10, 2002, now U.S. Pat. No. 6,738,113.

BACKGROUND OF THE INVENTION

1. Field of Invention

The invention relates to the structure of a TFT (Thin Film Transistor) LCD (Liquid Crystal Display) and the method for making the same. More particularly, the invention relates to the structure of an organic light-emitting material TFT LCD and the method for making the same.

2. Related Art

The light-emitting methods in the existing TFT LCD's can be classified as active and passive ones. Early light-emitting methods are all passive. A backlight source is used at the back of a glass substrate as the light source. A TFT IC (Integrated Circuit) on the glass substrate is used to control the liquid crystal layer between the glass substrate and a transparent conductive glass, so that the liquid crystal layer becomes transparent or opaque. Afterwards, the light passing through the liquid crystal layer is further filtered by color filter plates so that the emitted light can be red, green or blue. Through signal processing, light beams of three different colors are mixed to produce colorful images. This kind of passive light-emitting methods requires the use of a backlight source and the opening of the LCD has to be adjusted to obtain better light intensity.

With continuous researches and development in light-emitting materials, using light-emitting materials as the light sources of TFT LCD's becomes the trend in modern technologies. Using light-emitting organic materials as the light source in the TFT LCD and using TFT's to control the light-emitting material or the driving circuit for providing a voltage to the light-emitting material can easily control the bright spots on the LCD. The structure and manufacturing method for TFT LCD's can thus be greatly simplified.

The industry has developed mature technologies in producing red, blue and green organic light-emitting materials. Not only can they be used on an LED (Light-Emitting Diode) body, they can also be used as the light source of TFT displays. Since using organic light-emitting materials as the light sources of TFT displays only requires the use of the photolithographic and etching procedures to define the pattern on an organic light-emitting material layer, the yield can be effectively increased without being limited by the liquid crystal layer.

Therefore, it is desirable to have a new structure of TFT LCD, which uses red, blue and green light-emitting organic materials as the light source of the LCD and produces colorful images using a photo mask pattern. Furthermore, a manufacturing method for making the above-mentioned light source is proposed to more effectively assemble the LCD's.

SUMMARY OF THE INVENTION

The invention provides a structure of an organic material TFT LCD and its manufacturing method. The invention uses a red-blue-green organic light-emitting pattern layer as the light source of the LCD. TFT's are employed to control whether the organic light-emitting pattern layer emits light.

The invention provides a structure of an organic material TFT LCD and its manufacturing method. The invention uses a red, blue and green organic light-emitting materials as light sources. The color light emissions are directly modulated and controlled to produce color images without the use of color filters.

The invention provides a structure of an organic material TFT LCD and its manufacturing method. The invention uses a red, blue and green organic light-emitting materials as light sources. TFT's and a transparent conductive glass layer are used to control the light emissions of the red, blue and green organic light-emitting materials.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The disclosed organic light-emitting material TFT LCD has a piece of glass as the LCD substrate. The glass substrate is formed with a plurality of TFT's, forming the control circuit of the LCD. A conductive layer is deposited on top of the TFT's, forming a metal contact layer of the TFT's. A flat film layer is then formed on top of the TFT's and the conductive layer. The flat film layer is defined with a red organic light-emitting material pattern, a blue organic light-emitting material pattern, and a green organic light-emitting material pattern. The organic light-emitting material patterns are in alignment with the TFT's so that the TFT's can use voltage to control whether the light-emitting material should emit light. The top of the organic light-emitting material pattern layer is covered with a transparent conductive glass layer as one of the electrodes of the organic light-emitting material pattern layer. Finally, a photo mask pattern layer is deposited on the transparent conductive glass layer to fill the openings among the organic light-emitting material patterns, preventing different colors from mixing with one another.

Figure 1:
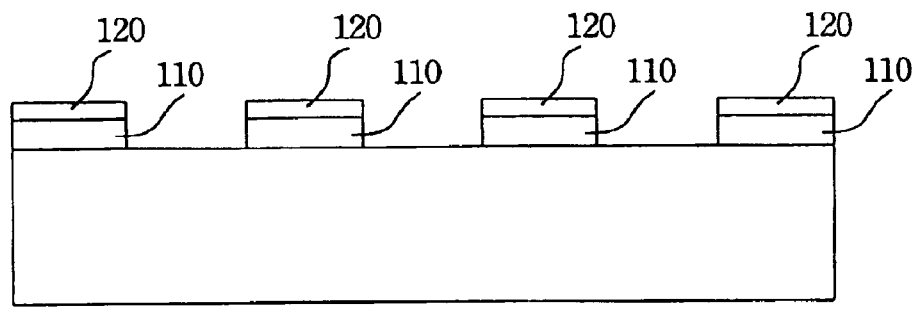
FIG. 1 is a schematic cross-sectional view of the disclosed LCD, where a glass substrate is formed with TFT's that are further covered by a metal material as a metal contact layer.

With reference to FIG. 1, a glass substrate 100 is provided as the base of a TFT LCD. The top of the glass substrate 100 is formed with a plurality of TFT's 110, forming the control circuit of the LCD. Afterwards, a conductive layer 120 is deposited on top of the TFT's 110, forming a metal contact layer for the TFT's 110. According to a preferred embodiment of the invention, the conductive layer 120 is made of a metal conductive material.

Figure 2:
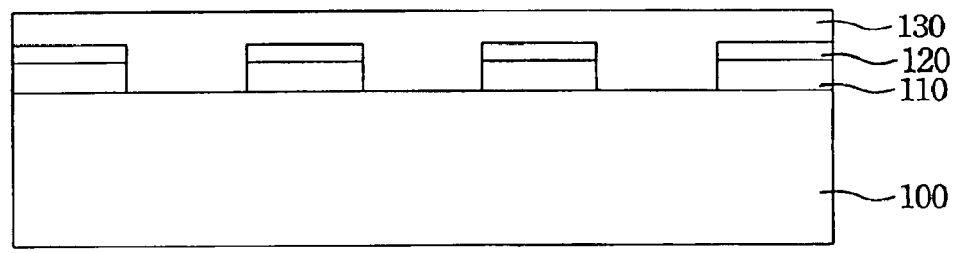
FIG. 2 is a schematic cross-sectional view of the disclosed LCD, where a cover layer is deposited on the TFT's and the metal layer to form a planarized surface.

With reference to FIG. 2, a cover layer 130 is deposited on top of the TFT's 110 and the conductive layer 120, forming a planarized surface. In accordance with a preferred embodiment of the invention, the cover layer 130 is made of polyamide, acrylize, or a transparent photo resist material.

The cover layer 130 can also be made of silicon nitride. A chemical machine polishing procedure is employed to planarize the surface of the cover layer 130.

Figure 3:
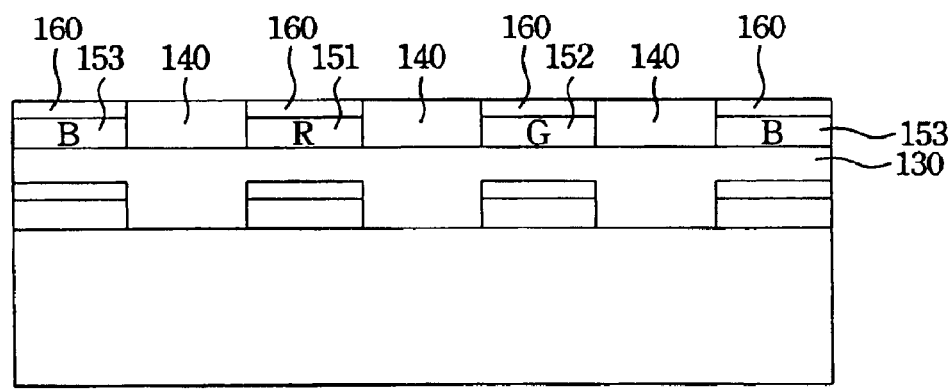
FIG. 3 is a schematic cross-sectional view of the disclosed LCD, where the cover layer is defined with a red organic light-emitting layer, a blue organic light-emitting layer, and a green organic light-emitting layer in order, the top of the organic light-emitting layers is covered with a transparent conductive glass layer, and finally a photo mask layer is defined among the organic light-emitting layers.

With reference to FIG. 3, the cover layer 130 is defined with a red organic light-emitting material pattern 151 by first depositing a layer of red organic light-emitting material and then form a desired pattern using photolithographic and etching procedures. Using the same method, the cover layer 130 is further defined with a blue organic light-emitting material pattern 153 and a green organic light-emitting material pattern 152. In accordance with a preferred embodiment of the invention, the red organic light-emitting material is made of a red organic LED material, the blue organic light-emitting material is made of a blue organic LED material, and the green organic light-emitting material is made of a green organic LED material.

With further reference to FIG. 3, the top of the red, blue, and green organic light-emitting material patterns 151, 153, 152 are deposited with a transparent conductive layer 160. According to a preferred embodiment of the invention, the transparent conductive layer 160 is an ITO material. Finally, a photo mask pattern layer 140 is deposited among the red, blue, and green organic light-emitting material patterns 151, 153, 152 to prevent different colors from mixing with one another. The organic light-emitting patterns are in alignment with the TFT's so that the TFT's can use voltage to control the light emissions from the organic light-emitting patterns.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A manufacturing method for an organic light-emitting material TFT display, which comprises the steps of:

providing a glass substrate;

providing a plurality of TFT's on top of the glass substrate, forming a control circuit of the display;

depositing a conductive layer on top of the plurality of TFT's;

depositing a cover on top of the conductive layer and the plurality of TFT's, forming a planarized surface;

forming a red organic light-emitting material pattern on the cover layer;

forming a blue organic light-emitting material pattern on the cover layer;

forming a green organic light-emitting material pattern on the cover layer;

defining a transparent conductive glass pattern layer on top of the red organic light-emitting material pattern, the blue organic light-emitting material pattern, and the green organic light-emitting material pattern; and defining a photo mask pattern layer on top of the cover layer to fill the openings among the red organic light-emitting material pattern, the blue organic light-emitting material pattern, and the green organic light-emitting material pattern, preventing different colors of light from mixing with one another.

2. The method of claim 1, wherein the conductive layer is made of a conductive metal material.

3. The method of claim 1, wherein the red organic material pattern is made of red organic LED (Light-Emitting Diode) material.

4. The method of claim 1, wherein the blue organic material pattern is made of blue organic LED (Light-Emitting Diode) material.

5. The method of claim 1, wherein the green organic material pattern is made of green organic LED (Light-Emitting Diode) material.

6. The method of claim 1, wherein the cover layer is made of a material selected from the group consisting of polyamide, acrylize, and transparent photo resist materials.

7. The method of claim 1, wherein the cover layer is made of silicon nitride followed by a planarization performed using a chemical machine polishing procedure.

8. The method of claim 1, wherein the transparent conductive layer is made of an ITO material.

* * * * *